United States Patent [19]

Johnson et al.

[11] Patent Number: 4,825,907
[45] Date of Patent: May 2, 1989

[54] LOW RESTRICTION FLUID CONTROL VALVE

[75] Inventors: J. Les Johnson, Morrisville; John R. Hanning, Wake Forest, both of N.C.

[73] Assignee: Parker Hannifin Corporation, Cleveland, Ohio

[21] Appl. No.: 209,662

[22] Filed: Jun. 21, 1988

[51] Int. Cl.[4] .................. F15B 13/043; F16K 3/16; F16K 11/065

[52] U.S. Cl. .................. 137/625.25; 137/625.48; 137/625.64; 137/625.66; 251/175; 251/900

[58] Field of Search .................. 137/625.25, 625.48, 137/625.64, 625.66; 251/175, 196, 900

[56] References Cited

U.S. PATENT DOCUMENTS

| | | | |
|---|---|---|---|
| 3,329,168 | 7/1967 | Vollmer | 251/175 X |
| 3,463,192 | 8/1969 | Herion | 137/625.25 X |
| 3,683,966 | 8/1972 | Payne | 137/625.48 |
| 3,917,220 | 11/1975 | Gilmore | 137/625.25 X |
| 4,304,261 | 12/1981 | Forester | 251/175 X |
| 4,526,202 | 7/1985 | Chorkey | |
| 4,548,238 | 10/1985 | Chorkey | |

FOREIGN PATENT DOCUMENTS

| | | |
|---|---|---|
| 1213187 | 3/1966 | Fed. Rep. of Germany . |
| 1288389 | 1/1969 | Fed. Rep. of Germany . |
| 44-4949 | 2/1969 | Japan .................. 137/625.64 |

OTHER PUBLICATIONS

Pages 41 and 42 of Parker Fluidpower catalog.
Wabco brochure, 1986.

*Primary Examiner*—Gerald A. Michalsky
*Attorney, Agent, or Firm*—Ralph E. Jocke

[57] ABSTRACT

A low restriction fluid control valve has a body (12) which a first inlet port (14) and first and second outlet ports (16, 18). The valve body has an internal cavity (24). A rectangular slide (50) having a circular aperture (52) is movable in said cavity. Movement of the slide places the outlet ports of the valve selectively in fluid communication with the inlet port through the circular aperture of the slide.

13 Claims, 5 Drawing Sheets

LOW RESTRICTION FLUID CONTROL VALVE

TECHNICAL FIELD

This invention relates to valves which are used to control the flow of fluids. Particularly, this invention relates to valves which direct fluid from an inlet port to a selected outlet port and which pass fluid through the valve with a minimum of flow resistance.

BACKGROUND ART

Several designs are known in the prior art for fluid control valves which have reduced flow resistance. German Patent No. 1,213,187 discloses a valve with a movable internal slide. The slide is connected on one side to a flexible hose. The opposite side of the slide is adjacent outlet ports in the valve body. Fluid passes from the hose through the slide. By shifting the position of the slide, fluid is selectively delivered to the outlet ports. The slide is spring loaded against the outlet ports to avoid fluid loss. A polished metal insert is used to enable movement of the slide across the outlet ports and to avoid excessive wear. A drawback associated with this design is that the slide must be spring loaded which necessitates the use of considerable force to shift the slide. The actuator portion of the valve which moves the slide must therefore be operated at high pressure or must be sufficiently large to produce the required force at low pressures.

German Patent No. 1,288,389 also discloses a valve having an internal slide. The slide is housed within the valve body and is moved between locations inside the valve to direct fluid to selected outlet ports. The slide must be highly polished and in close tolerance with the interior of the valve body to achieve sealing and avoid fluid loss. This valve construction poses significant resistance to flow and would be expensive to produce.

U.S. Pat. No. 4,526,202 discloses a low resistance valve which includes an internal sliding member. The member is connected to a flexible hose inside the valve body. Fluid enters the valve and is directed through the flexible hose and slide portions to an outlet port. An alternative form of the valve employs a seal between the sliding member and the outlet port to minimize fluid loss. It is expected that a valve made in accordance with this design would pose reliability problems due to the use of an internal flexible hose member.

Two designs for low restriction fluid control valves are disclosed in U.S. Pat. No. 4,458,238. One such design uses a rotatable rocker member to direct fluid from an inlet port to a selected outlet port. Due to the rotatable nature of the rocking member, it would be difficult to avoid fluid loss inside the valve. Another design disclosed in this patent employs a slider member which moves longitudinally to direct fluid to selected outlet ports. The slider member is spring loaded or made in very close tolerance with the cavity in which it is housed to avoid fluid losses. This valve would require high force to shift the sliding member and would be expensive to produce.

Thus, there exists a need for a low restriction directional fluid control valve which can be made inexpensively, which has low internal fluid loss, is reliable and which can be operated at lower pressures than valves known in the prior art.

DISCLOSURE OF INVENTION

It is an object of the present invention to provide a directional fluid control valve which has low internal flow resistance.

It is a further object of the present invention to provide a directional fluid control valve that has few internal parts and high reliability.

It is a further object of the present invention to provide a directional fluid control valve which is inexpensive to manufacture.

It is a further object of the present invention to provide a directional fluid control valve that has reduced internal fluid pressure losses.

It is a further object of the present invention to provide a direction fluid control valve that can be operated at lower pressures.

Further objects of the present invention will be made apparent in the following best modes for carrying out the invention and the appended claims.

The foregoing objects are achieved in the preferred form of the present invention by a valve having a body with a first inlet port and first and second outlet ports. The inlet port of the valve is adapted for connection to a source of pressurized fluid such as compressed air. The outlet ports of the valve may be connected to conventional devices actuated by fluid pressure such as pneumatic cylinders. The valve has an internal cavity bounded by a pair of opposed planar side walls. The fluid inlet port is connected to a first inlet opening in the first side wall. The first and second outlet ports are connected to first and second outlet openings respectively in the second planar side wall.

A flat rectangular slide is mounted for movement in the cavity. The slide has a circular aperture extending through the slide. The inlet and outlet openings are positioned so that when the slide is in a first location, the first inlet opening and first outlet opening are in fluid connection through the aperture. In this first location, the second outlet opening is in connection with the cavity area outside the slide. The cavity is connected to an exhaust port in the valve body. This enables fluid to escape from the outlet port which is not in connection with the inlet port.

When the slide is moved in the cavity to a second location disposed from the first location, the inlet opening and second outlet opening are in fluid connection through the aperture. In the second location, the first outlet opening is in connection with the cavity area outside the slide, and an exhaust port.

The valve also incorporates a pair of opposed movable plungers. The plungers are in contact with the slide and move it between the first and second locations. The plungers are moved in response to fluid pressure supplied by a solenoid actuated pilot control valve incorporated in the body of the valve.

Mounted in the aperture of the slide is a compound expandable seal. The seal prevents air loss between the aperture and the adjacent planar side walls of the cavity. The seal includes upper and lower o-rings. Sandwiched between the o-rings is a resilient inner member having angled leg portions. As pressure is applied to the aperture, the leg portions diverge and compress the o-rings applying sealing force which varies with the pressure in the aperture.

To change the condition of the valve beginning with the slide in the first location, fluid pressure from inside the aperture is diverted through the pilot control valve to a plunger. The plunger moves the slide laterally toward the second location. As the pilot valve operates to begin moving the slide, the pressure inside the aperture is relieved for an instant which reduces sealing force against the side walls. This helps the slide to move more readily toward the second location. As the slide begins moving toward the second location, fluid pressure in the aperture recovers rapidly. Once the slide is in the second location, the fluid delivered to the aperture is transmitted to the second outlet opening. Fluid is discharged from the valve at the second outlet port and is transmitted to a device to which the port is connected. As back pressure at the second outlet port builds, the pressure rises inside the aperture. This causes the expandable sealing member to apply further sealing force against the planar side walls to avoid fluid loss.

In the second slide location, any fluid which is returned to the valve at the first outlet opening travels through the cavity on the outside of the slide and is exhausted through an exhaust port of the valve.

When it is desired to change the condition of the valve, the pilot control valve applies fluid pressure to an opposed plunger to shift the slide back to the first location. Once this slide is in the first location, fluid from the inlet port is delivered to the first outlet port and fluid returning to the valve at the second outlet port is exhausted from the valve body.

BEST MODES FOR CARRYING OUT INVENTION

Figure 1:
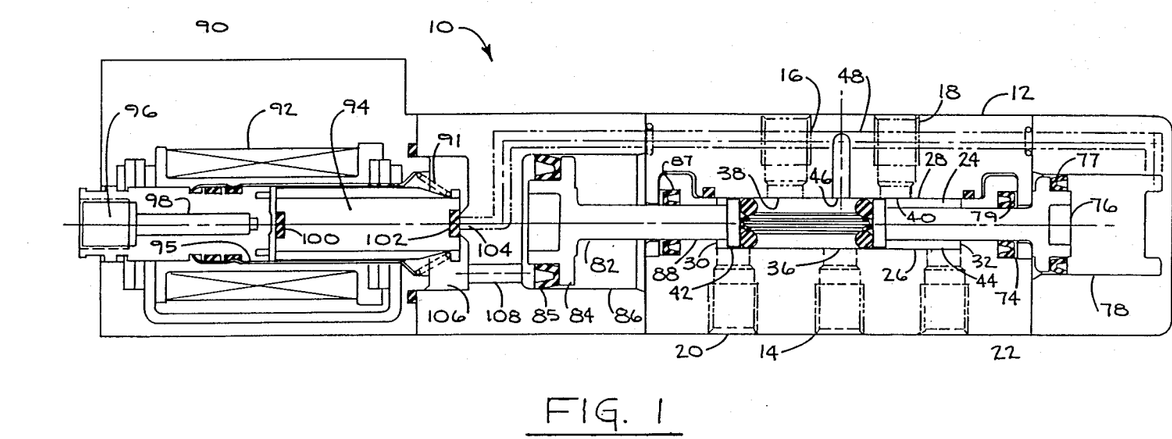
FIG. 1 is a cut away side view of the preferred form of the valve of the present invention.

Referring now to the drawing and particularly to FIG. 1, there is shown therein a cross sectional view of the preferred from of the valve of the present invention generally indicated 10. The valve has a body 12. Body 12 includes a first inlet port 14 for accepting a fluid line such as a compressed air line. Body 12 also includes a first outlet port 16 and a second outlet port 18. Outlet ports 16 and 18 are intended to be connected to a conventional pneumatic actuator device such as a pneumatic cylinder. Body 12 also includes a first exhaust port 20 and a second exhaust port 22. As later explained, the exhaust ports allow fluid which is returned from the pneumatic device to be exhausted through the valve.

Figure 2:
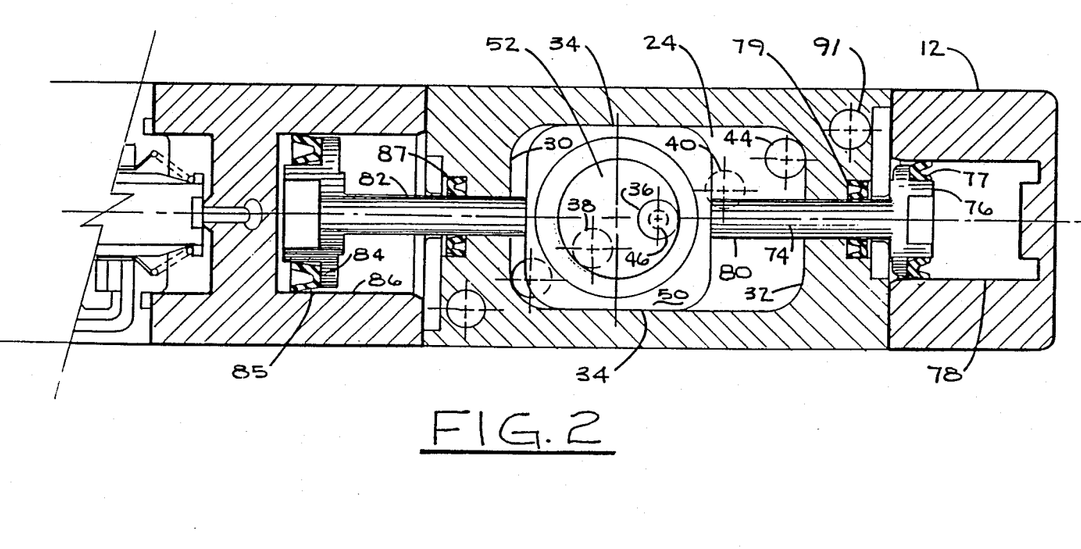
FIG. 2 is a cut away top view of the valve shown in FIG. 1.
Figure 3:
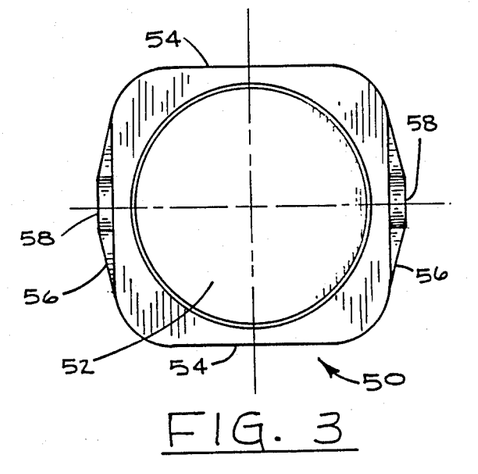
FIG. 3 is a top view of the slide portion of the valve.
Figure 4:
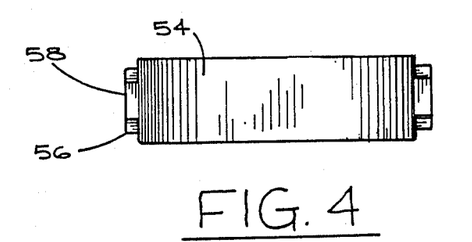
FIG. 4 is a lateral side view of the slide.
Figure 5:
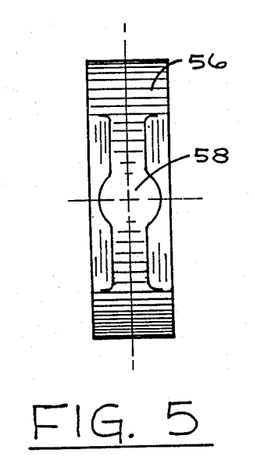
FIG. 5 is a longitudinal side view of the slide.

A flat rectangular cavity 24 is enclosed within body 12 (see FIG. 2). Cavity 24 is bounded vertically by first and second planar side walls 26 and 28 respectively. Cavity 24 is bounded laterally by first and second cavity end walls 30 and 32. Cavity 24 is also bounded by side walls 34 which extend between the end walls.

Inlet port 14 is in fluid connection with a first inlet opening 36 in first side wall 26. First inlet opening 36 is a circular opening through which fluid enters cavity 24 from the inlet port. A first outlet opening 38 extends through second planar side wall 28. First outlet opening 38 is in fluid connection with cavity 24 and with first outlet port 16. A second outlet opening 40 extends through second planar side wall 28 and is in fluid connection with second outlet port 18. The inlet and outlet ports have a straight through relationship with the internal cavity to reduce flow resistance.

A first exhaust outlet opening 42 extends through first planar side wall 26 and is in fluid connection with first exhaust port 20. A second exhaust outlet opening 44 extends through first planar side wall 26 and is in fluid connection with second exhaust port 22.

A manifold inlet opening 46 extends through second planar side wall 28. Opening 46 is in fluid connection with a manifold line 48 which is used to control the condition of the valve as later explained. Manifold opening 46 is positioned centrally in the valve body above inlet opening 36.

A rectangular slide 50 is mounted for movement inside cavity 24. As shown in FIGS. 2 through 6, slide 50 includes a circular aperture 52 which extends all the way through the slide. Slide 50 is bounded at its exterior by a pair of paralled side walls 54 which are sized to fit within cavity side walls 34 with sufficient clearance to allow slide 50 to move therein. Slide 50 also includes a pair of opposed end walls 56. End walls 56 incorporate a pair of circular projections 58 the purpose of which are later explained.

Figure 6:
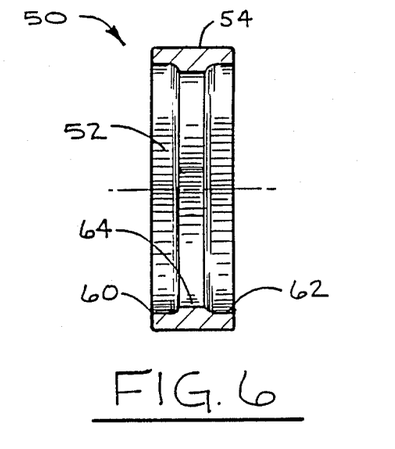
FIG. 6 is a lateral side cross sectional view of the slide.
Figure 7:
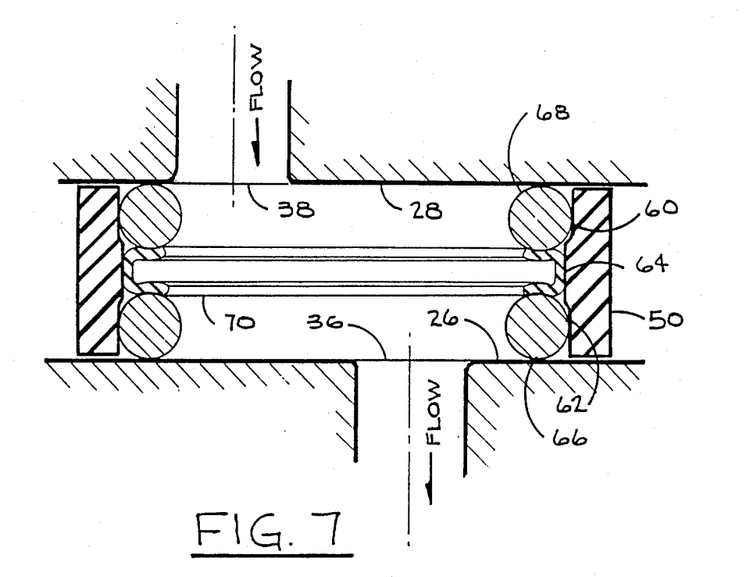
FIG. 7 is a lateral side cross sectional view of the slide and aperture seal of the preferred form of the valve of the present invention.
Figure 8:
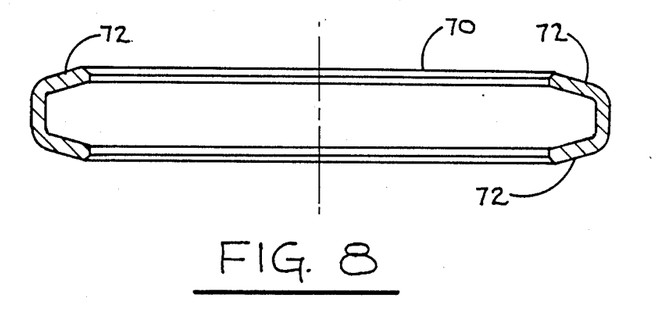
FIG. 8 is a cross sectional view of the inner seal member of the aperture seal.

Slide 50 is shown in cross section in FIG. 6. Aperture 52 includes a pair of recessed portions 60 and 62 adjacent the outer faces of the slide. The slide also has an indented area 64 at a central portion of the aperture. Recessed portion 62 serves as a seat for a first resilient o-ring 66 (see FIG. 7). Recessed portion 60 serves as a seat for a second resilient o-ring 68. Supported on indented area 64 between the o-rings is a U-shaped resilient seal member 70 (see FIG. 8). Seal member 70 includes a pair of angled, inwardly extending leg portions 72. O-rings 68 and 66 and seal member 70 together form expandable seal means. The expandable seal means seals aperture 52 and the adjacent planar side walls 26 and 28 which bound cavity 24.

As best shown in FIG. 2, valve body 12 also houses a first plunger 74. First plunger 74 includes a piston portion 76 which is movable in a cylindrical chamber 78. Chamber 78 is in fluid connection with manifold 48. Plunger 74 also has an extended portion 80 with extends through end wall 32 and into cavity 24. Extended portion 80 contacts slide 50 at one of the circular projections 58. Body 12 and plunger 74 incorporate conventional seal means 77, 79 to prevent fluid from passing from cavity 78 and cavity 24.

A second plunger 82 is mounted in body 12 in an opposed arrangement with plunger 74. Plunger 82 includes a piston portion 84 which is movable in a cavity 86. Plunger 82 includes an extended portion 88 which extends into cavity 24 and contacts slide 50. Conventional seal means 85, 87 are used to prevent the passage of fluid from cavity 86 and cavity 24. As shown in FIGS. 1 and 2, valve body 12 is made in sections to provide ease of assembly the internal parts. Body 12 also incorporates two holes 91 which may be used to mount the valve.

A pilot control valve 90 is also housed in valve body 12. Control valve 90 is of conventional construction well known in the art and is actuated by an electrical solenoid 92. Control valve 90 includes a spool 94 which is movable longitudinally in a sleeve 95 in the valve. Spool 94 is moved in response to the condition of the magnetic field produced by the solenoid. Control valve 90 also has a relief outlet 96 which is connected to a pipette 98 inside the valve. Pipette 98 includes air passage (not shown) which extends from relief outlet 96 to an opening at the innermost tip of the pipette adjacent spool 94. The tip of pipette 98 is shown in the open condition in FIG. 1. Spool 94 incorporates a seal 100 which blocks the flow of fluid through pipette 98 when the spool is moved adjacent the pipette. Spool 94 also incorporates a second seal 102 on the end opposite seal 100. For a first condition of the spool shown in FIG. 1 seal 102 is moved adjacent and in a blocking relation with a control port 104. Spool 94 is biased toward its first condition by a spring 91. Control port 104 is in fluid connection with manifold 48. When spool 94 is disposed from control port 104, the control port is opened to a control chamber 106. Control chamber 106 is also connected to a passageway 108. Passageway 108 connects chamber 106 to chamber 86.

Fundamental advantages of the preferred form of the valve construction of the present invention are the simplicity and low flow resistance through the valve. As shown in FIG. 2, first inlet opening 36 and first outlet opening 38 are arranged to be in fluid connection through aperture 52 of slide 50, when the slide is in a first longitudinal location. When the slide is in the first location, second outlet opening 40 is in fluid communication with first exhaust opening 44 through the area of cavity 24 on the outside of the slide. This allows fluid that is returned to the valve at second outlet port from a pneumatic cylinder or other device, to be exhausted through exhaust port 22. In the preferred embodiment of the valve shown in FIG. 1, the first location of the slide is the farthest extent of slide travel to the left.

When slide 50 is shifted in cavity 24 to a second location, to the full extent of its travel to the right, first inlet opening 36 enters into fluid communication through aperture 52 with second outlet opening 40. In the second location of the slide, first outlet opening 38 is outside aperture 52 and is in fluid communication with first exhaust opening 42 through cavity 24 on the outside of the slide.

In the operation of the valve, fluid pressure for controlling the position of the slide is drawn from aperture 52 through manifold opening 46. Opening 46 due to its central location in the valve, is always in fluid communication with aperture 52 regardless of the location of the slide.

When control valve 90 is in the condition shown in FIG. 1, seal 102 blocks control port 104. With control port 104 blocked, the pressure in manifold 48 is applied to chamber 78. This pressure forces first plunger 74 to the left which moves slide 50 to the first location. When the valve is in the condition shown in FIG. 1, air in cavity 86 which houses piston 84 of second plunger 82, is exhausted through passageway 108 to control chamber 106. Control chamber 106 is in fluid connection with pipette 98 and relief outlet 96 through air passages (not shown) with extend longitudinally through sleeve 95 on the outside of spool 94.

When the electrical condition of control valve 90 is changed, spool 94 moves so that seal 100 blocks the tip of pipette 98. The movement of spool 94 opens control port 104 which enables the pressure in manifold 48 to enter control chamber 106, passageway 108 and chamber 86. In this condition, chambers 78 and 86 are both subjected to the pressure in manifold 48. However, because piston 84 of second plunger 82 has greater surface area than piston 76 of first plunger 74, second plunger 82 develops a greater force and moves slide 50 to the right. As slide 50 reaches the second location to the full extent of its travel to the right, fluid is no longer delivered at first outlet port 16 and is instead delivered at second outlet port 18. Concurrently, second outlet port 18 is disconnected from second exhaust port 22 and first outlet port 16 connected to first exhaust 20.

The expandable seal construction inside aperture 52 reduces the amount of shifting force required to move slide 50 between the first and second locations. This is accomplished by lowering the fluid pressure in aperture 52 for an instant each time control valve 90 begins to change its condition. Relieving the pressure in the aperture results in lessening the force applied to the leg portions 72 of seal member 70. This correspondingly reduces the outward sealing force applied to o-rings 66 and 68 so that they begin sliding on side walls 26 and 28 of cavity 24 more readily. This makes the valve easier to shift. Once the slide begins moving, pressure inside the aperture rises. This results in greater sealing force being applied between the o-rings and the side walls. To prevent damage to the o-rings, the corners of openings 38 and 40 are radiused to allow the seals to pass over them without catching. The expandable nature of this seal is also a desirable aspect in that it enables the valve to be made with greater tolerances without leakage. In the preferred form of the invention the valve body and slide are made of plastic material. The correlation between shifting force and sealing pressure of the aperture enable the valve to shift satisfactorily at low inlet pressures. The preferred form of the seal and valve are also inexpensive to manufacture. Of course in other embodiments of the valve, other types of sealing arrangements and materials may be used.

Thus, the new low restriction, directional control valve achieves the above stated objectives eliminates difficulties encountered in the use of prior devices, solves problems and obtains the desirable results described herein.

In the foregoing description, certain items have been used for brevity, clarity and understanding, however, no unnecessary limitations are to be implied therefrom because such terms are for descriptive purposes and are intended to be broadly construed. Moreover, the descriptions and illustrations are by way of examples and the invention is not limited to the details shown and described.

Having described the features, discoveries and principles of the invention, the manner in which it is constructed and operated and the advantages and useful results obtained, the new and useful structures, devices, elements, arrangements, parts, calculations, systems, equipment, operations and relationships are set forth in the appended claims.

We claim:

1. A low restriction fluid directing valve for selectively delivering fluid between ports of the valve, comprising:
  (a) a body, said body including a first inlet port and a first outlet port;
  (b) a cavity within said body, said cavity including first and second opposed planar walls;
  (c) a first inlet opening in said first planer wall in fluid communication with said first inlet port;

(d) a first outlet opening in said second planer wall in fluid communication with said first outlet port;

(e) a slide mounted for movement in said cavity, said slide incorporating an aperture extending through said slide, whereby when said slide is in a first location in said cavity, said first inlet and first outlet openings are in communication through the aperture;

(f) sealing means for sealing said aperture and said first inlet and first outlet openings in fluid tight relationship, said sealing means including a first resilient o-ring in contact with said first planar wall, a second resilient o-ring in contact with said second planar wall, and force application means for applying a sealing force to said first and second o-rings responsive to fluid pressure in said aperture, said force application means including an expandable member positioned between said o-rings in said aperture, said expandable member including in cross section a first resilient leg portion in contact with said first o-ring and a second resilient leg portion in contact with said second o-ring, said leg portions deformable in response to fluid pressure; and (g) movement means for moving said slide between said first location and a second location in said cavity, wherein said first inlet opening and first outlet opening are not in fluid communication; whereby selectively moving said slide between said first and second locations, selectively enables fluid to be delivered from said first inlet port to said first outlet port.

2. The valve according to claim 1 and further comprising pressure relief means for reducing fluid pressure in said aperture as said slide is moved between said first and second locations.

3. The valve according to claim 1 wherein said aperture is circular.

4. A low restriction fluid directing valve for selectively delivering fluid between ports of the valve, comprising:

(a) a body, said body including a first inlet port, a first outlet port and a second outlet port;

(b) a cavity within said body, said cavity having opposed first and second planer walls;

(c) a first inlet opening in said first planar wall in fluid communication with said first outlet port;

(d) a first outlet opening in said second planar wall in fluid communication with said first outlet port;

(e) a second outlet opening in said second planar wall disposed from said first outlet opening, said second outlet opening in fluid communication with said second outlet port;

(f) a slide mounted for movement in said cavity, said slide including a circular aperture through said slide, whereby in a first location of said slide said first inlet opening is in fluid communication through said aperture with said first outlet opening, but is not in fluid communication with said second outlet opening; and in a second location of said slide said first inlet opening is in fluid communication through said aperture with said second outlet opening, but is not in fluid communication with said first outlet opening;

(g) sealing means for sealing said aperture and said adjacent planar walls, said sealing means including a first resilient seal adjacent said first planar wall, a second resilient seal adjacent second planar wall and an expandable member positioned between said first and second resilient seals, said expandable member including in cross section a first resilient angled leg portion in contact with said first seal, and a second resilient angled leg portion in contact with said second seal, whereby fluid pressure in said aperture deflects said leg portions to apply sealing force to said seals; and (h) movement means for selectively moving said slide between the first and second locations, whereby movement of said slide selectively delivers fluid from said first inlet port to said outlet ports.

5. The valve according to claim 4 wherein said slide includes first and second lateral surfaces adjacent said first and second planar walls respectively and a first exterior wall surface of said slide generally traverse of said lateral surfaces and wherein said cavity is generally fluid tight, and further comprising:

(a) a first exhaust port in said valve body;

(b) a first exhaust opening from said cavity, said first exhaust opening being in fluid communication with said first exhaust port, whereby when said slide is in said first location, said first exterior wall surface of said slide is sufficiently disposed of the second outlet opening to enable fluid to pass from said opening to said cavity, and fluid delivered to said valve at said second outlet port is enabled to pass through said cavity to said first exhaust port.

6. The valve according to claim 5 wherein said first exhaust opening is in said first planar wall, and when the slide is in the first location said first exterior wall surface of said slide is sufficiently disposed of said first exhaust opening to enable fluid to pass from said cavity to said opening.

7. The valve according to claim 6 and further comprising:

a second exterior wall surface of said slide generally traverse of said lateral surfaces and opposed of said first exterior wall surface, said second exterior wall surface sufficiently disposed of said first outlet opening when said slide is in the second location to enable fluid to pass from said opening to said cavity, a second exhaust opening in said first planar wall, said second exhaust opening in fluid communication with an exhaust port, said second exterior side wall of said slide sufficiently disposed of said second exhaust opening when the slide is in the second location to enable fluid to pass from said cavity to said opening;

whereby fluid delivered to said first outlet port is enabled to pass through said cavity to said second exhaust opening when the slide is in the second location.

8. The valve according to claim 7 and further comprising a second exhaust port in fluid communication with said second exhaust opening.

9. The valve according to claim 8 wherein said first resilient seal is a first resilient o-ring.

10. The valve according to claim 9 wherein said second resilient seal is a second resilient o-ring.

11. The valve according to claim 4 and further comprising pressure relief means for relieving pressure in the aperture as the slide is moved between the first and second locations.

12. A low restriction fluid directing valve for selectively delivering fluid between ports of the valve, comprising:

(a) a body, said body including a first inlet port and a first outlet port;
(b) a cavity within said body, said cavity including first and second opposed planar walls;
(c) a first inlet opening in said first planar wall in fluid communication with said first inlet port;
(d) a first outlet opening in said second planar wall in fluid communication with said first outlet port;
(e) a slide mounted for movement in said cavity, said slide incorporating an aperture extending through said slide, whereby when said slide is in a first location in said cavity, said first inlet and first outlet openings are in communication through the aperture;
(f) sealing means for sealing said aperture and said first inlet and outlet openings in fluid tight relationship, said sealing means including a first resilient seal in contact with said first planar wall a second resilient seal in contact with said second planar wall and an expandable member positioned between said first and second seals, said expandable member including a first resilient leg portion in contact with said first seal and a second resilient leg portion in contact with said second seal, said leg portions deformable responsive to fluid pressure in said aperture to apply sealing force on said seals; and
(g) movement means for moving said slide between said first location and a second location in said cavity, wherein said first inlet opening and first outlet opening are not in fluid communication; whereby selectively moving said slide between said first and second locations, selectively enables fluid to be delivered from said first inlet port to said first outlet post.

13. A low restriction fluid directing valve for selectively delivering fluid between ports of the valve, comprising:
(a) a body, said body including a first inlet port and a first outlet port;
(b) a cavity within said body, said cavity including first and second opposed planar walls;
(c) a first inlet opening in said first planar wall in fluid communication with said first inlet port;
(d) a first outlet opening in said second planar wall in fluid communication with said first outlet port;
(e) a slide mounted for movement in said cavity, said slide incorporating an aperture extending through said slide, whereby when said slide is in a first location in said cavity, said first inlet and first outlet openings are in communication through the aperture;
(f) sealing means for sealing said aperture and said first inlet and outlet openings in fluid tight relationship, said sealing means including an expandable member having a first resilient leg portion and a second resilient leg portion, said leg portions deformable in a direction traverse of said first and second planar walls responsive to fluid pressure in said aperture to apply sealing force; and
(g) movement means for moving said slide between said first loction and a second location in said cavity, wherein said first inlet opening and first outlet opening are not in fluid communication; whereby selectively moving said slide between said first and second locations, selectively enables fluid to be delivered from said first inlet port to said first outlet port.

* * * * *